(12) United States Patent
Wensel

(10) Patent No.: US 6,961,772 B1
(45) Date of Patent: Nov. 1, 2005

(54) TRANSPARENT CONNECTION TYPE BINDING BY ADDRESS RANGE

(75) Inventor: Chris K. Wensel, Dallas, TX (US)

(73) Assignee: Recursion Software, Inc., Frisco, TX (US)

( * ) Notice: Subject to any disclaimer, the term of this patent is extended or adjusted under 35 U.S.C. 154(b) by 0 days.

(21) Appl. No.: 09/451,699

(22) Filed: Nov. 30, 1999

(51) Int. Cl.$^7$ ............................................. G06F 15/16
(52) U.S. Cl. .................... 709/227; 702/62; 709/213; 709/219; 709/229; 709/238; 709/239; 709/346; 709/250; 713/161; 713/165; 713/168; 713/200; 713/201; 714/11
(58) Field of Search ................................ 709/201, 227

(56) References Cited

U.S. PATENT DOCUMENTS

| | | | | |
|---|---|---|---|---|
| 5,745,703 A | * | 4/1998 | Cejtin et al. | |
| 5,787,175 A | * | 7/1998 | Carter | ........................ 713/165 |
| 5,867,665 A | * | 2/1999 | Butman et al. | ............. 709/239 |
| 5,987,506 A | * | 11/1999 | Carter et al. | |
| 6,006,018 A | * | 12/1999 | Burnett et al. | |
| 6,061,740 A | * | 5/2000 | Ferguson et al. | |
| 6,092,196 A | * | 7/2000 | Reiche | |
| 6,134,591 A | * | 10/2000 | Nickles | ...................... 709/229 |
| 6,138,235 A | * | 10/2000 | Lipkin et al. | ................ 713/155 |
| 6,141,759 A | * | 10/2000 | Braddy | |
| 6,178,505 B1 | * | 1/2001 | Schneider et al. | ........... 713/168 |
| 6,338,089 B1 | * | 1/2002 | Quinlan | |
| 6,347,341 B1 | * | 2/2002 | Glassen et al. | |

* cited by examiner

*Primary Examiner*—Ario Etienne
*Assistant Examiner*—Michael Y. Won
(74) *Attorney, Agent, or Firm*—Baker Botts L.L.P.

(57) ABSTRACT

A client object on a first network requests access to a server object on a second network. A third network connects the first network to the second network. A connections properties table is associated with the first network and includes an entry for each of one or more second networks that are accessible by the first network. The connections properties table also includes connection protocol information for accessing the one or more second networks. A connection manager generates a boundary traversal key for requests for access to server objects that have a corresponding entry in the connections properties table. The boundary traversal key is generated from the corresponding connection protocol information in the connections properties table.

27 Claims, 3 Drawing Sheets

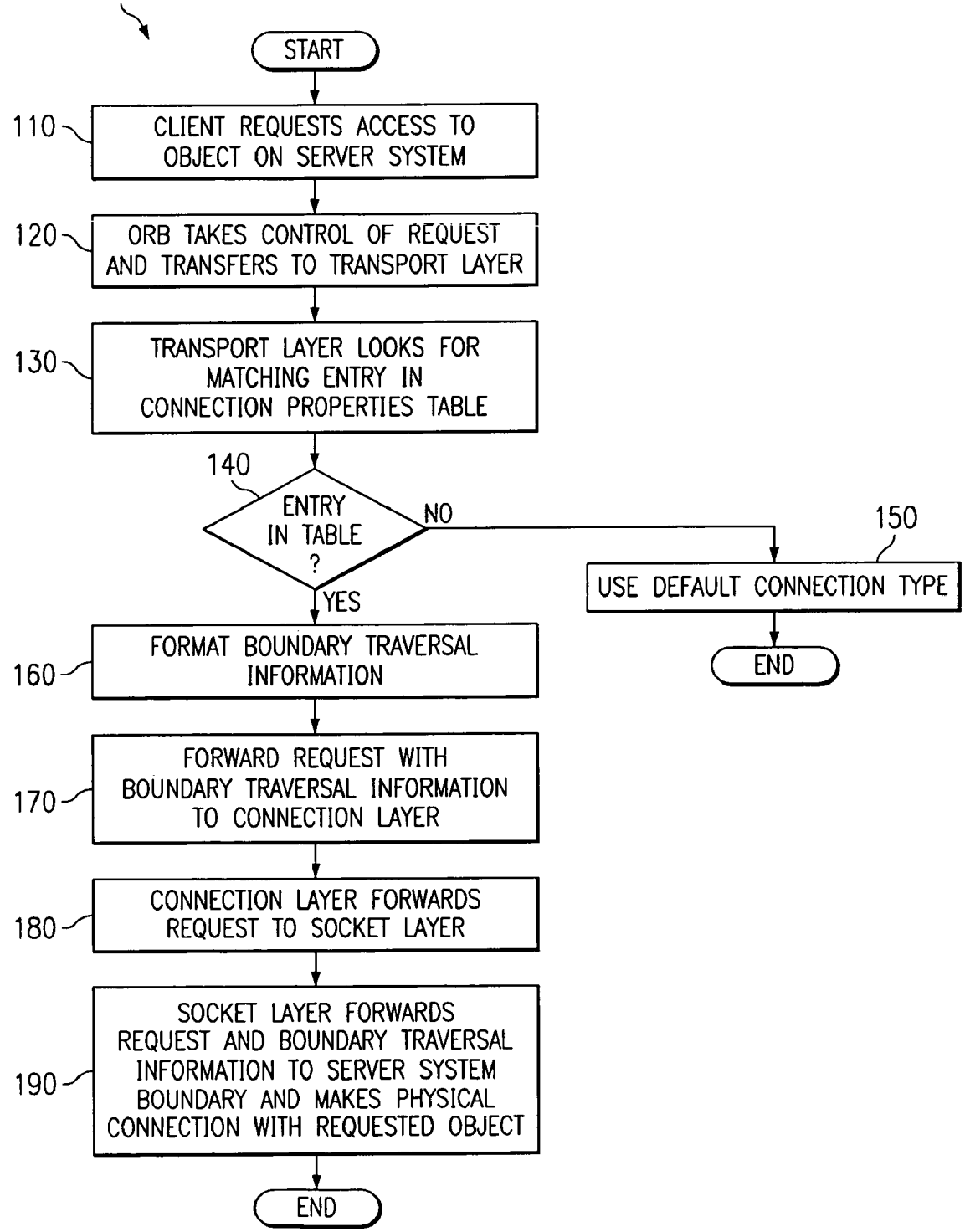

TRANSPARENT CONNECTION TYPE BINDING BY ADDRESS RANGE

TECHNICAL FIELD OF THE INVENTION

This invention relates in general to the field of distributed processing systems and more particularly to an improved transparent connection type binding by address range.

BACKGROUND OF THE INVENTION

Object oriented programming is a method of programming which abstracts a computer program into manageable sections. The key to object oriented programming is the concept of encapsulation. Encapsulation is a method by which the subroutines, or methods, that manipulate data are combined with the declaration and storage of that data. This encapsulation prevents the data from arbitrarily being accessed by other program subroutines, or objects. When an object is invoked, the associated data is available and can be manipulated by any of the methods which are defined within the object to act upon the data. The basic component of encapsulation is a class. A class is an abstraction for a set of objects that share the same structure and behavior. An object is a single instance of a class that retains the structure and behavior of the class. Objects also contain methods which are the processes by which an object is instructed to perform some procedure or manipulation of data which it controls. Classes may also be characterized by their interface which defines the elements necessary for proper communication between objects.

Distributed computing allows an object on one computer system to seamlessly communicate with and manipulate an object contained in a second computer system when these computers are connected with a computer network. This second computer system may also be referred to as another address space. Sophisticated distributed computing systems have removed the communications burden from the computer programs, or objects in an object oriented programming environment, and placed it in a mid-level operating system. The purpose of the mid-level operating system is to manage communications across a computer network to facilitate a client's access to and manipulation of data contained on a server system, for example a computer remote to the user in a different address space. Distributed computing and distributing object management systems may be generally referred to as distributed processing systems or distributed processing environments.

Distributed computing and object oriented programming have led to the development of distributed object management systems. When an object on a client computer system requests access to an object which exists only on a server computer system, the distributed object management system steps in to facilitate the communication between the two computer systems and, thus, between the two objects. The distributed object management system removes the requirement of the object on the client system communicating directly with the object on the server system. Instead, current distributed object management systems create a remote proxy object on the client system which models the interface of the object that exists on the server system. The client computer system that requested access to the remote object communicates with the remote proxy object which now exists on the client computer system. Therefore, the client computer system can operate as if it is communicating directly with a local object. The remote proxy object contains the necessary communications information to allow the client computer system to access and manipulate an object which actually exists on the server computer system. Remote proxies allow the client system to disregard the location of the requested object and the communication details.

The different address spaces in which computer systems exist may also be referred to as different environments. Each environment may include a boundary to control access to and access from the environment. The boundary prevents access to the environment by unauthorized users. It also prevents users within the environment from exiting the environment if not authorized to do so.

In a distributed processing environment, an object in a client environment may request access to an object in a server environment. However, the server environment may include a boundary. Current distributed processing systems provide access to the server environment by publishing boundary traversal information in a directory associated with the server which is available to the public. The public directory for the server environment provides information for traversing the boundary into the server environment. Having this information in a public directory may compromise security.

Another method of providing access to the server environment is to embed the access information in domain code residing in the client environment. Domain code is business specific application software. Use of this method requires maintaining of all the domain code for each change in the boundary traversal information.

Testing of client systems that request access to server systems that have a boundary is often accomplished by the client system actually traversing the boundary of the server system and gaining access thereto. Allowing an untested client system to gain access to a live server system can be problematic and compromise the security of the server system. Therefore, unanticipated problems may arise in the server system while testing the client system.

SUMMARY OF THE INVENTION

Accordingly, a need has arisen for transparent connection type binding by address range which provides transparent connections within a distributed processing environment without compromising security. In accordance with the present invention, transparent connection type binding by address range is provided which substantially eliminates or reduces disadvantages and problems associated with conventional boundary traversal systems.

According to one embodiment of the present invention, a boundary traversal system is provided that comprises a client object on a first network and a server object on the second network. The client object is operable to request access to the server object. The system further comprises a third network that connects the first network to the second network. A connections properties table associated with the first network includes an entry for each of one or more second networks accessible by the first network. The connections properties table further includes connection protocol information for accessing the one or more second networks. The system further comprises a connection manager operable to generate a boundary traversal key for requests for access to server objects that have a corresponding entry in the connections properties table. The boundary traversal key is generated from the corresponding connection protocol information and the connections properties table.

One important technical advantage of the present invention is that boundary traversal information is stored in a private directory associated with a client system. This eliminates potential compromises of security. Another technical advantage of the present invention is reduced maintenance of server side access information since client systems are responsible for maintaining access information for servers that the client may access. Yet another important advantage of the present invention is enhanced testing capabilities since developers can simulate various scenarios. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and in which:

FIG. 4 illustrates a flow diagram illustrating a method for transparent connection type binding by address range.

DETAILED DESCRIPTION OF THE INVENTION

Figure 1:
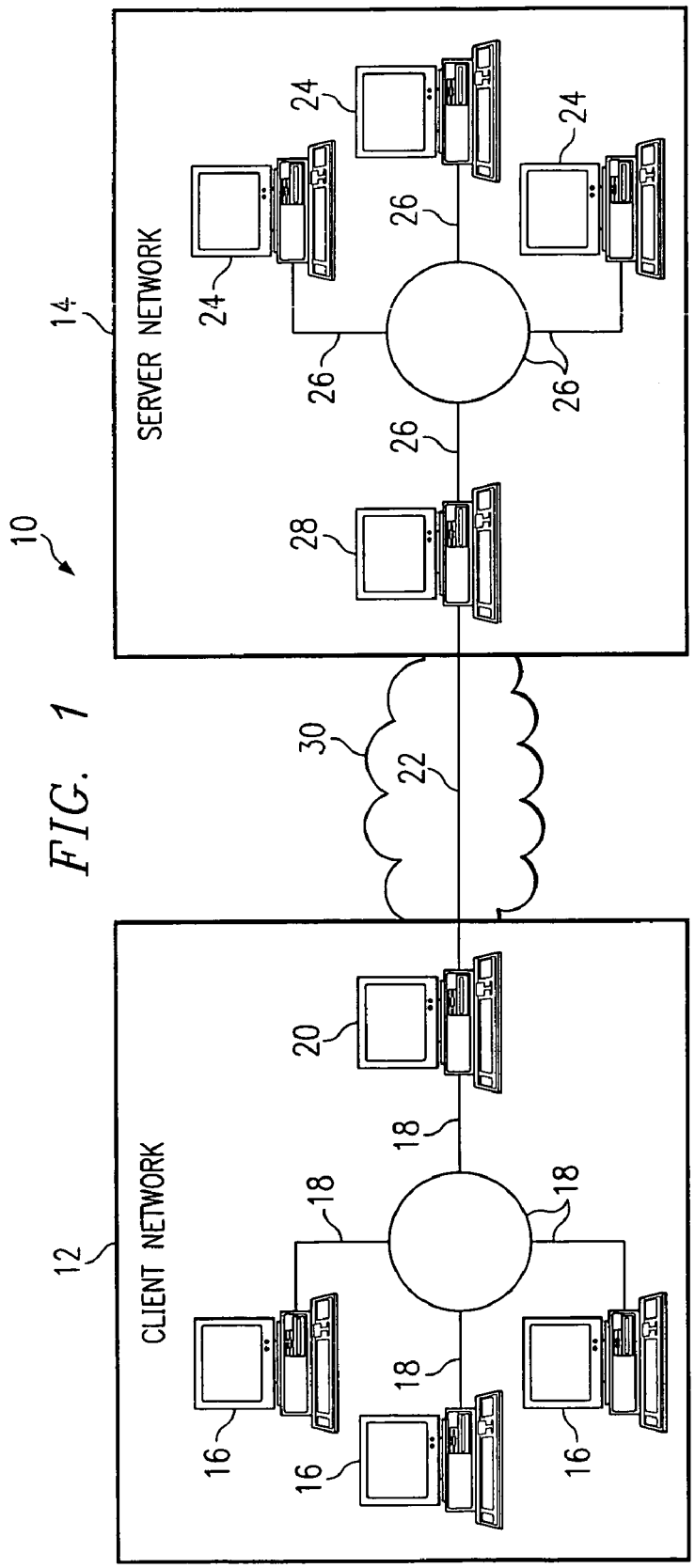
FIG. 1 illustrates a block diagram of a distributed processing system.

Referring to FIG. 1, a distributed processing system is generally indicated at 10. Distributed processing systems are sometimes referred to as client/server systems. Servers respond to requests by clients and provide access to information, or objects, existing on the server system. Client systems and server systems are typically computers that may comprise any suitable digital processing device. In this application, computers and other digital processing devices will be referred to generally as machines.

Distributed processing system 10 includes a client system 12 and a server system 14. Client system 12 may include one or more client machines 16. Client machines 16 may be networked with a client network 18. Client network 18 may include a local area network, wide area network, or any other suitable network. Client system 12 includes a logical grouping of machines. In one embodiment, client system 12 is a network for a business and may include machines located in the same building, the same geographic area, or all machines connected to the business network regardless of location. The client network 18 may be coupled to a client boundary 20. Client boundary 20 may be a firewall, secured server, or other similar device to control access to client system 12. Client boundary 20 prevents unauthorized access to or unauthorized access from client system 12. The use of boundaries provides for a more secure computing environment.

Client system 12 may be connected to a network 22. Network 22 may be any suitable network including the Internet. Smaller networks such as client system 12 that are connected to a larger network 22 such as the Internet should have unique Internet protocol (IP) addresses to facilitate communications between machines connected to the network. An Internet protocol address is 32 bits long and is written as w.x.y.z. where each letter w, x, y, and z represents 8 bits of the address and has a range of zero to 255. Another way to uniquely identify a smaller network, such as client system 12 connected to a larger network such as network 22, is by domain name. A domain name may be in the following format: www.x.y. WWW stands for the World Wide Web. X can be any name, such as a business name, that uniquely identifies the network. Y is an extension that identifies the type of organization to which the domain name applies. For instance, ".gov" identifies a government network, ".edu" identifies an educational institution, and ".com" identifies a commercial entity, such as a business. A machine identified by an IP address may have several ports that are each identified by a unique address.

Computer networks that are attached to the Internet are referred to as "public" networks, and they must have a globally unique IP address which is registered with an organization responsible for allocating available IP addresses. A computer network which will not be connected to the Internet and is intended only for the internal use of the network owner is referred to as a "private" network. A private network must maintain unique network addresses within its own network. However, private networks are not concerned with network addresses outside of the private network.

Server system 14 may include one or more server machines 24. Server machines 24 may comprise a computer or any suitable digital processing device. Server machines 24 are networked with a server network 26. The server network 26 may be connected to a server boundary 28. Server boundary 28 may be a firewall, secured server, or any other suitable machine for controlling access to and access from server system 14. All incoming communications to server system 14 and outgoing communications from server system 14 pass through server boundary 28. Server boundary 28 prevents unauthorized access to and access from server system 14. In order for server system 14 to receive and process requests from client system 12, server system 14 should be connected to network 22.

In distributed processing system 10, communications between client system 12 and server system 14 are controlled by an object request broker (ORB) 30. ORB 30 may be any suitable ORB including CORBA (Common Object Request Broker Architecture), a technology for inter-object communications developed by a consortium of companies, and DCOM, an inter-application communication system for netwbrked computers developed by Microsoft. In one embodiment, company B (the owner of server system 14) wants to give company A (the owner of client system 12) access to certain objects, or information, residing on server machines 24. In that case, server machines 24 would be considered servers since they would respond to requests by client machines 16. Company B provides access information including boundary traversal information for entering server system 14 through server boundary 28. The access information and boundary traversal information comprise the key to traversing server boundary 28 and gaining access to server system 14.

Figure 2:
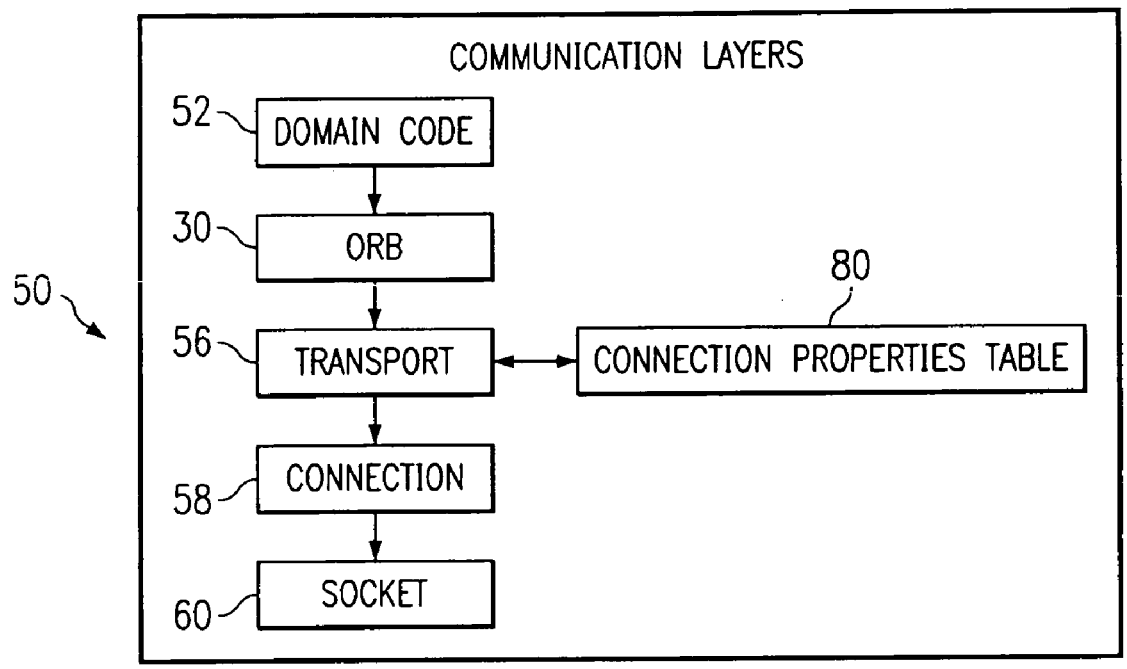
FIG. 2 illustrates a block diagram of typical communication layers in the distributed processing system.

Referring to FIG. 2, communication layers in distributed processing system 10 are generally indicated at 50. Domain code 52 is business specific application programs that may request access to other objects. A request for access to an object outside client system 12 is passed to ORB 30 for processing. ORB 30 passes the request to a transport layer 56. Transport layer 56 governs and manages connections between objects existing in separate systems, or address spaces. Transport layer 56 passes the request to a connection layer 58. Connection layer 58 provides the logical connection between objects residing in separate systems. Connection layer 58 passes the request to a socket layer 60. Socket layer 60 provides the physical connection between objects residing in separate systems. The physical connection is typically a TCP/IP protocol connection. In order to traverse server boundary 28 and gain access to the requested object, the request needs appropriate boundary traversal information to server boundary 28.

In the present invention, transport layer 56 uses a connection properties table 80 to determine the access information and boundary traversal information for the system in which the requested object resides so that a boundary may be traversed if necessary. By using connections properties table 80 in transport layer 56 of ORB 30, connection type binding is kept transparent from client system 12 and server system 14.

Figure 3:
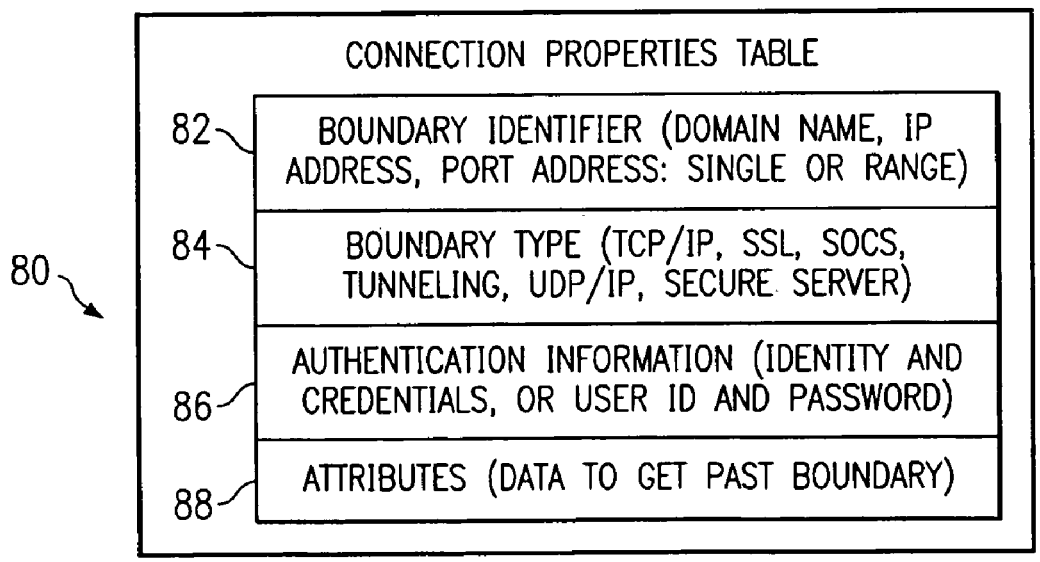
FIG. 3 illustrates a connection properties table for a client system.

Referring to FIG. 3, a connection properties table is generally indicated at 80. Connection properties table 80 includes connection protocol information for identifying the type of connection to be made and the information needed to make the connection. Connection properties table 80 includes a boundary identifier 82, a boundary type 84, authentication information 86, and attributes 88. Boundary identifier 82 may be a domain name or any part thereof, an IP address or any part thereof, an IP address range, a port address, or a port address range.

Boundary type 84 identifies the type of boundary which must be traversed to gain access to the machine or network identified by boundary identifier 82. Boundary type 84 may include an identifier for TCP/IP, SSL, SOCS, HTTP Tunneling, UDP/IP, secure server, or any other suitable boundary type. Boundary type 84 identifies various protocols which may require specific information to authorize access by a client.

Authentication information 86 provides identity and credential information that the boundary controlling access to the machine or network identified by boundary identifier 82 requires before granting access to the machine or network. Authentication information 86 may be a user ID and password assigned by the owner of the machine or network identified by boundary identifier 82.

Attributes 88 includes the specific information needed to traverse the boundary controlling access to the machine or network identified by key 82. Attributes 88 may be a string of information that is formatted for the boundary type identified by boundary type 84.

A server system 14 owner that is providing access to objects, or information, on server system 14 supplies the appropriate information to build connection properties table 80. Connection properties table 80 exists in a private directory on client system 12. Client system 12 maintains an entry in connection properties table 80 for each outside system to which it has authorized access. By placing the boundary traversal information in connection properties table 80, the server systems which grant access to client systems do not need to maintain a list of authorized users. In addition, boundary traversal information does not need to be published in a public directory associated with the server system.

Use of connection properties table 80 also provides greatly increased testing flexibility for system developers. System developers can simulate the various types of boundary traversals before actually attempting to enter a live server system. This prevents potential security risks to the server system which may occur during the testing process. Connection properties table 80 binds the connection type, which consists of boundary type 84, authentication information 86, and attributes 88, to an address range, which consists of boundary identifier 82, transparently since connection properties table 80 is utilized by transport layer 56 in ORB 30. Domain code 52 is unaware and unconcerned with the actual location of the requested object.

Referring to FIG. 4, a method of transparent address range connection type binding is generally indicated at 100. The method commences at step 110 where a client system 12 requests access to an object on a server system 14. The request for access may originate with an object on any client machine 16. Client boundary 20 authorizes the communication outside client system 12 and passes the request to ORB 30.

The method proceeds to step 120 where ORB 30 takes control of the request and transfers the request to transport layer 56. Since ORB 30 makes communication between client system 12 and server system 14 transparent, different communication layers are used to abstract the communications methodology so that domain code 52 is not concerned with the location of an object to which it requests access.

The method proceeds to step 130 where transport layer 56 searches for an entry in connection properties table 80 that matches the request. Transport layer 56 will look for a match based on the various keys 82 which may be defined for connection properties table 80. The request includes an identification of the requested object. The identification may be an IP address, a partial IP address, a domain name, a partial domain name, or a port address. The partial IP address or partial domain name may incorporate one or more wildcard characters to define a portion of the IP address or domain name. A wildcard character is a special symbol that stands for one or more characters. Use of a wildcard character enables a comparison based on a partial identifier. One example of a wildcard character is the asterisk as used in M*.doc. M*.doc refers to all identifiers that start with M and end with .doc. Transport layer 56 compares the identification in the request to the boundary identifier 82 in connection properties table 80. The identification may explicitly match an entry in connection properties table 80, the identification may match a partial boundary identifier 82, or the identification may be within a range identified by boundary identifier 82. Partial boundary identifier 82 may use wildcards, as described above, to stand for one or more characters within boundary identifier 82.

The method proceeds to decisional step 140 where a decision is made regarding the existence of a matching entry in connection properties table 80 for the request. If there is no match in the connection properties table 80, the NO branch of decisional step 140 leads to step 150 where a default connection type is used. The default connection type could be a direct connection without security information, a TCP/IP connection with user ID, or any other type of connection. After step 150, the method terminates.

Returning to step 140, if there is a match in the connection properties table 80, the YES branch of decisional step 140 leads to step 160 where transport layer 56 formats boundary traversal information. The boundary traversal information includes authentication information 86 and attributes 88 formatted such that the boundary type indicated by boundary type 84 will accept the boundary traversal information and allow the request to proceed into the server system 14.

The method proceeds to step 170 where transport layer 56 forwards the request with boundary traversal information to connection layer 58. The method proceeds to step 180 where connection layer 58 forwards the request with boundary traversal information to socket layer 60.

The method proceeds to step 190 where socket layer 60 forwards the request with boundary traversal information to the server boundary 28 and makes a physical connection with the requested object. After step 190, the method terminates.

Thus it is apparent that there has been provided, in accordance with the present invention, transparent address range connection type binding that generates boundary traversal information from data stored on a client system is provided that satisfies the advantages set forth above. Although the present invention and its advantages have been described in detail, it should be understood that various changes, substitutions, and alterations may be readily ascertainable by those skilled in the art and may be made herein without departing from the spirit and the scope of the present invention as defined by the following claims.

What is claimed is:

1. A method for traversing a boundary in a distributed processing environment, comprising:
    storing connection protocol information in a connection properties table at a client network for each boundary for one or more server networks accessible by the client network;
    receiving a request from a client object on the client network for access to a server object on a server network, the server network having a server network boundary;
    locating an entry the connections property table corresponding to the requested server object;
    formatting a boundary traversal key from the connection protocol information associated with the located entry in the connection properties table, the boundary traversal key including information to traverse a boundary controlling access to the server network; and
    forwarding the request for access and the boundary traversal key to the boundary controlling access to the server network.

2. The method of claim 1, further comprising determining a connection type from the located entry in the connections property table.

3. The method of claim 1, further comprising:
    passing the request for access to an object request broker after the client network determines that the request for access is to an object residing outside the client network.

4. The method of claim 3, wherein the object request broker locates the entry, formats the boundary traversal key, and forwards the request for access and the boundary traversal key to the server network.

5. The method of claim 1, wherein storing connection protocol information includes storing a boundary identifier, a connection type, authentication information, and connection attributes in the connection properties table.

6. The method of claim 5, wherein locating an entry includes matching an internet protocol address for the server object to the boundary identifiers stored in the connection properties table.

7. The method of claim 5, wherein locating an entry includes matching a domain name for the server object to the boundary identifiers stored in the connection properties table.

8. The method of claim 5, wherein locating an entry includes matching a port address for the server object to the boundary identifiers stored in the connection properties table.

9. The method of claim 5, wherein formatting the boundary traversal key includes building the boundary traversal key from the authentication information and the connection attributes in a format defined by the connection type.

10. The method of claim 1, wherein forwarding the request includes forwarding the request for access and the boundary traversal key to the server network boundary.

11. The method of claim 1, further comprising:
    receiving the request for access and the boundary traversal key at the server network boundary;
    allowing access to the server object if the server network boundary accepts the boundary traversal key; and
    denying access to the server object if the server network boundary rejects the boundary traversal key.

12. A distributed computing system, comprising:
    a client object on a first network operable to request access to a server object on a second network;
    a third network connecting the first network to the second network;
    a boundary device controlling access to the second network;
    a connections properties table in the first network and including an entry for each of one or more second networks accessible by the first network, the connections properties table including connection protocol information for accessing the one or more second networks;
    a connection manager operable to generate a boundary traversal key for requests for access to server objects that have a corresponding entry in the connections properties table, the boundary traversal key generated from the corresponding connection protocol information, the boundary traversal key including information to traverse the boundary device controlling access to the second network.

13. The system of claim 12, further comprising a default connection manager operable to establish a connection between the client object and the server object using a default protocol for requests for access to server objects that do not have a corresponding entry in the connection properties table.

14. The system of claim 12, wherein the third network is an Internet.

15. The system of claim 12, further comprising an object request broker operable to facilitate communications between the client object and the server object across the third network.

16. The system of claim 15, wherein the connection manager is part of the object request broker.

17. The system of claim 12, wherein the connection properties table includes:
    a boundary identifier for identifying the server object on the second network;
    a connection type for identifying the type of connection protocol used by the second network;
    authentication information for providing identity and credential information to the second network; and
    attributes for providing boundary traversal key information to the second network.

18. The system of claim 12, wherein the connection properties table is stored in a private directory on the first network.

19. The system of claim 17, wherein the boundary traversal key is generated from the authentication information and the attributes from an entry in the connection properties table corresponding to the server object on the second network.

20. The system of claim 17, wherein the boundary identifier is an identifier selected from the group consisting of an internet protocol address, an internet protocol address range, a partial internet protocol address, a domain name, a partial domain name, a port address and a port address range.

21. The system of claim 17, wherein the connection type indicates a TCP/IP connection, an SSL connection, an HTTP Tunneling connection, or a UDP/IP connection.

22. The system of claim 17, wherein the authentication information includes a user identification and a password.

23. A distributed processing system with transparent boundary traversal, comprising:
- a client system operable to request access to a plurality of server systems, at least one of the server systems having a boundary device for controlling access to the server system by the client system;
- a connection properties table stored in a private directory on the client system, the connection properties table including:
  - an identification range for identifying the at least one server system having the boundary device;
  - a boundary type for identifying a type of the boundary device;
  - authentication information for uniquely identifying the client system to the boundary device and a requested server system; and
  - attributes for providing traversal information required by the boundary device;
- a boundary traversal key generator operable to generate a boundary traversal key for gaining access to the requested server system through the boundary device, the boundary traversal key generated from the connection properties table in response to the boundary traversal key generator locating an entry matching the requested server system.

24. The system of claim 23, further comprising a network for connecting the client system to the server system.

25. The system of claim 24, further comprising an object request broker operable to facilitate communications between the client object and the server object across the network.

26. The system of claim 24, wherein the network is an internet.

27. The system of claim 25, wherein the boundary traversal key generator is part of the object request broker.

* * * * *